Dec. 16, 1941.   T. J. McCORMICK   2,266,505
MEANS AND METHOD FOR COVERING AUTOMOTIVE VEHICLE CUSHIONS
Filed Oct. 15, 1938   2 Sheets-Sheet 1
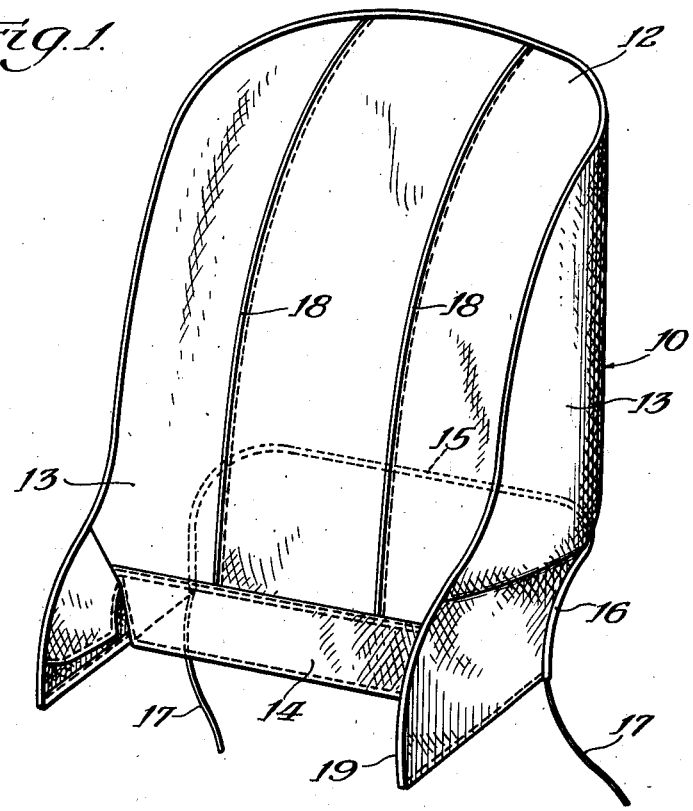
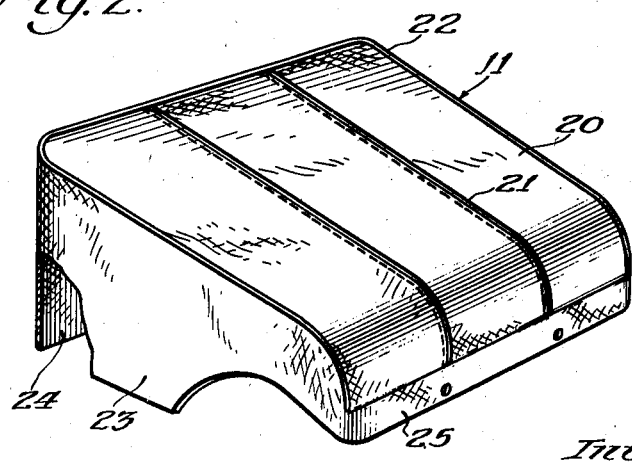
Inventor:
Thomas J. McCormick,
By Belt, Wallace & Cannon
Attorneys Dec. 16, 1941.  T. J. McCORMICK  2,266,505
MEANS AND METHOD FOR COVERING AUTOMOTIVE VEHICLE CUSHIONS
Filed Oct. 15, 1938  2 Sheets-Sheet 2
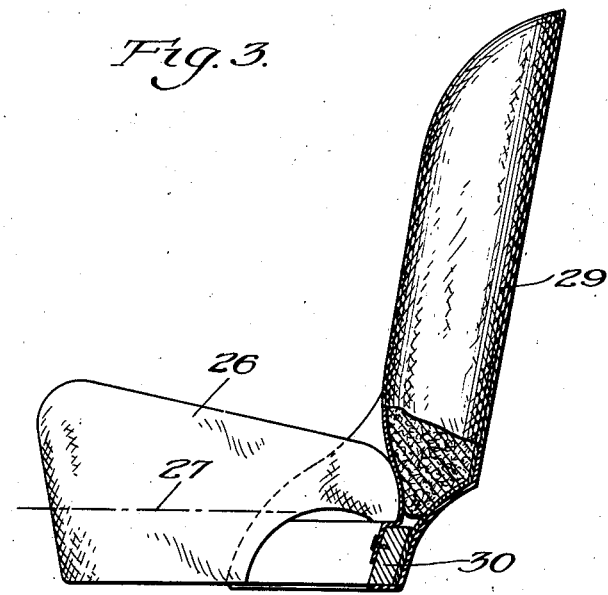
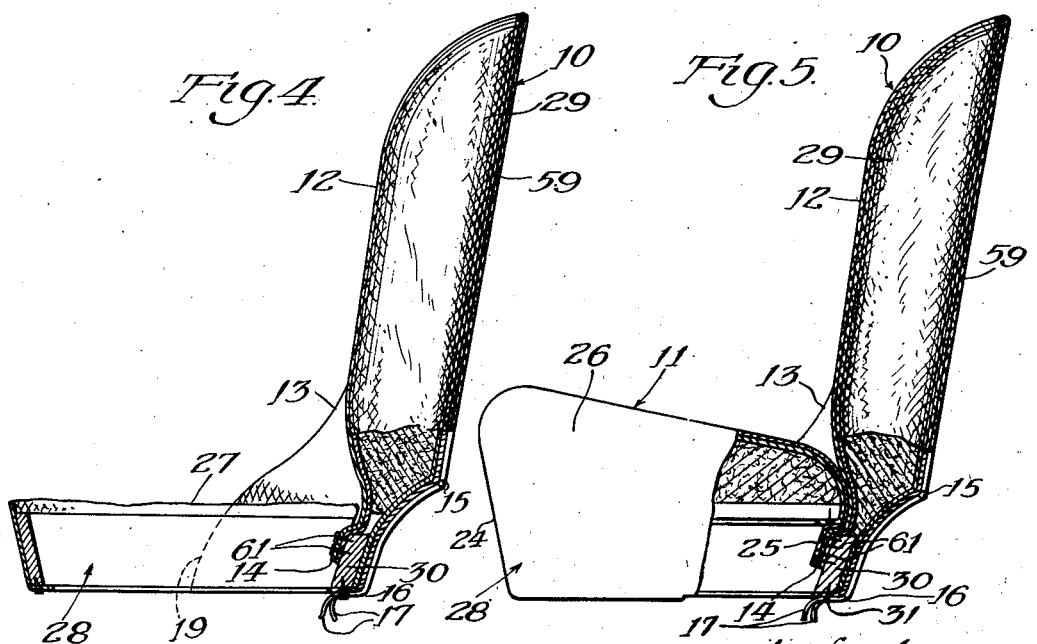
Inventor:
Thomas J. McCormick,
By: Belt, Wallace & Cannon
Attorney Patented Dec. 16, 1941

2,266,505

UNITED STATES PATENT OFFICE 2,266,505

MEANS AND METHOD FOR COVERING AUTOMOTIVE VEHICLE CUSHIONS

Thomas James McCormick, Detroit, Mich.

Application October 15, 1938, Serial No. 235,128

5 Claims. (Cl. 155—182)

This invention relates to means and methods for covering automotive vehicle seat cushions and back rest cushions.

An object of the present invention is to provide novel seat cushion and back rest cushion covers and which are especially adapted for use in recovering so-called "bucket" seats, and to provide a novel method for applying or installing such seat and back rest cushion covers in position of use.

So-called "bucket" seats of automotive vehicles are non-removable, and by reason of this fact the recovering of the seat and back rest cushions of such bucket seats presents a problem which has not heretofore, in so far as I am aware, been satisfactorily solved.

Another object of the present invention, therefore, is to provide seat and back rest cushions for bucket seats of automotive vehicles which may be installed in position of use without disassembling the entire seat structure and in a time and labor saving manner.

A further object of the present invention is to provide novel methods of installing seat and back rest covers upon the seat and back rest cushions of automotive vehicle seats of the so-called bucket type in an efficient and time and labor saving manner and in a manner which does not necessitate disassembling of the entire seat construction.

It is to be noted, in this connection, that seat and back cushion covers are used for two purposes in automotive vehicles, namely, first for use as a protection for the cushions when the car is new and, second, to improve and recondition the appearance of the upholstery in used cars so as to facilitate their resale, and it is in connection with this latter use that the present invention is particularly concerned.

It has been found, in this connection, that in the usual practice of covering seat and back cushions in used cars the prospective purchaser quickly gains the impression that the covers have been applied to the cushions for the purpose of concealing or covering up their badly worn condition, and this is true even though the cushions may not in fact be badly worn. This is due, in part, to the construction of such earlier seat and back cushion covers and, in part, to the manner of applying or installing the same.

Another object of the present invention, therefore, is to provide novel combination seat cushion covers and back rest cushion covers, which are especially adapted and designed for use in recovering or reupholstering the seat cushions and back rest cushions of used automobiles and which are so constructed and arranged that when in applied position they overcome the foregoing and other difficulties experienced in the use of the prior seat and back rest cushion covers and impart to such seat cushions and back cushions covered thereby the appearance either of new cushions or of reupholstered cushions, rather than merely the appearance of used seat and back rest cushions which have been recovered to conceal their used or badly worn condition.

The invention consists in the novel combination and arrangement of parts to be hereinafter described and claimed.

The invention will be best understood by reference to the accompanying drawings showing the preferred form of construction and in which:

Fig. 1 is a perspective view of a preferred form of one of the new covers for the back rest cushion of an automotive vehicle seat of the so-called "bucket" type;

Fig. 2 is a perspective view of a seat cover which is adapted for use in conjunction with the back rest cushion cover which is illustrated in Fig. 1;

Fig. 3 is a side elevational view of a so-called "bucket" seat, partly in section, illustrating the first step in the method of applying or installing the back rest cushion cover and the seat cushion cover which are illustrated in Figs. 1 and 2;

Fig. 4 is a sectional view of the bucket seat which is shown in Fig. 3 but illustrating another step or stage in the method of applying the back rest cushion cover and the seat cushion cover which are illustrated in Figs. 1 and 2;

Fig. 5 is a sectional view of the bucket seat shown in Figs. 3 and 4 but illustrating the back rest cushion cover which is shown in Fig. 1, and the seat cushion cover which is shown in Fig. 2 in installed position.

A typical form of the new back rest cushion cover for use upon the bucket seat of an automotive vehicle is illustrated in Fig. 1, and is therein generally indicated at 10, and the corresponding seat cushion cover is illustrated in Fig. 2, and is therein generally indicated at 11, these cushion covers 10 and 11 being particularly designed and adapted for use upon the bucket seat of a 1935 Chevrolet two door sedan, although it is to be understood that, with slight modifications of the construction and method herein described, they may be adapted for use upon the bucket seats of other automobiles and types of the same.

The new back rest cushion cover 10, as shown in Fig. 1, comprises the front piece or panel 12, the back piece or panel 59, side panels 13, and a lower front or bottom edge panel or portion 14 which is attached to the front panel 12, this front panel being formed of one piece which is sewed along seams 18 to give a piping effect thereto, and the back rest cushion cover 10 having piping 19 along its top and side marginal edges, as shown in Fig. 1.

Extending across the back panel 59 of the back rest cushion cover 10, at the rear thereof, is a flexible attaching element or cord 15 which is attached to or carried by the back panel 59, and which may be covered by and slidably guided in a suitable sleeve or the like which is indicated at 16. This flexible attaching element or cord 15 has end portions 17 which project outwardly of the sleeve 16 and which are adapted to be used in a manner which is to be described presently.

The seat cushion cover 11 comprises a top panel 20, side panels 23, a front panel 24, and a rear panel 25. The top panel 20 preferably is sewed along the seams 21 to give a piping effect thereto, and the seat cushion cover 11 is provided along its front and side edges with suitable piping 22.

The preferred method of installing the back rest cushion cover 10, which is illustrated in Fig. 1, and the seat cushion cover 11 which is illustrated in Fig. 2, upon the bucket seat of an automotive vehicle, such as that which is found in a 1935 Chevrolet two door sedan, and which is generally illustrated in Fig. 3, is as follows:

The upholstery and lining of the seat cushion 26 of the bucket seat (Fig. 3) is first cut along a line 27 which is located about an inch above the bottom edge of the seat cushion or, in other words, about an inch above the upper edge of the seat cushion frame 28, whereupon the entire seat cushion 26 is then removed from its supporting frame 28.

The back rest cover 10 is then slipped over the back rest cushion 29 and the lower front edge portion 14 of the back rest cushion cover 10 is then secured as by tacking 61 to the front side of the rear wall 30 of the seat cushion frame 28, as shown in Fig. 4, whereupon the flexible attaching elements or cords 17 are pulled down so as to tighten the back rest cushion cover about the back rest cushion 29. The flexible attaching elements or cords 17 are then attached to the underneath side of the rear wall 30 of the seat cushion frame 28, at the bottom thereof (Figs. 4 and 5), by means of suitable tacks or the like which are indicated at 31, thus completing the installation of the back rest cushion cover upon the back rest cushion 29.

The seat cushion cover 11 (Fig. 2) is then slipped over the seat cushion 26 and the seat cushion 26 with the seat cushion cover 11 thereon is then installed upon the seat cushion frame 28, whereupon the lower rear edge portion or section 25 of the seat cushion cover 11 is then tacked to the rear wall 30 of the seat cushion frame 28, over the lower edge portion 14 of the back rest cushion 10, as shown in Fig. 5. The seat cushion 26 with the seat cushion cover 11 thereon is then pushed into place and the front and both side edges or edge portions of the seat cushion cover 11 are then tacked under the seat cushion frame 28, as indicated at 32, Fig. 5, thus completing the installation of the back rest cushion cover 10 and the seat cushion cover 11 upon the bucket seat of an automotive vehicle of the type referred to above.

It will be found that by employing the seat cushion cover and the back rest cushion cover, and by following the method of installing the same described above, the seat and back rest cushion of an automotive vehicle seat of the bucket type may be recovered without the necessity for entirely disassembling such bucket seat construction, and in an efficient and time and labor saving manner.

It will be found that in the use of the new seat cushion covers and back rest cushion covers the same impart to the seat and back rest cushions of a used car the appearance of new seat and back cushions or at least the appearance of cushions which have been reupholstered, rather than merely recovered, and hence the prospective purchaser does not get the impression that the seat and back cushions have merely been recovered to conceal their badly worn or badly damaged condition, as is commonly the case when using the earlier or prior art forms of seat and back cushion covers.

The favorable impression and appearance thus created by the use of the present seat and back cushion covers is due, in part, to the construction and method of installing of the same, and to a considerable extent to the use of piping, such as 18, 19, 21 and 22, along the sides or marginal edges or upon the front face of both the back rest cushion covers (Fig. 1) and the seat cushion covers (Fig. 2) and, in so far as the present applicant is aware, such piping has not heretofore been used in automotive vehicle seat and back cushion covers, and it greatly increases the strength and wearing qualities of the cushion covers along the marginal edges on which it is used, namely, at the front and upper edges of the side panels (23) of the seat cushion covers, and along the intersection between the front and rear panels (such as 12—59) of the back rest cushion cover, and along the marginal edges or points of intersection between the top, front and side portions of the seat cushion cover.

It should be noted, in this connection, that the use of the present seat and back cushion covers does not and is not intended to perpetrate a fraud upon the prospective purchaser of a used car to which such seat and back cushion covers are applied since the latter are made of very durable and serviceable, as well as attractive, material which is, in a used car, practically as good as upholstery upon the cushions, while being much less expensive than the latter.

While I have illustrated and described preferred forms of construction for carrying my invention into effect, these are capable of variation and modification, without departing from the spirit of the invention. I, therefore, do not wish to be limited to the precise details of construction set forth, but desire to avail myself of such variations and modifications as come within the scope of the appended claims.

I claim:

1. The method of installing a seat cushion cover and a back rest cushion cover upon the seat cushion and back rest cushion of an automotive vehicle seat of the so-called bucket type, said seat cushion cover being of the type which includes a top panel and a rear panel and which includes other portions integrally secured to said top panel, and said back rest cushion cover being of the type which includes a rear panel and a front panel integrally secured to each other, which comprises cutting the seat cushion loose from its supporting frame by cutting horizontally through the body of the said seat cushion along a line located slightly above the upper surface of the said seat cushion supporting frame and then removing the thus severed portion of the said seat cushion from its supporting frame while leaving the remaining portion attached thereto, slipping the back rest cushion cover onto the back rest cushion and securing the bottom edge portion of the front panel of the back rest cushion cover to the rear wall of the seat cushion supporting frame in downwardly extending relationship, securing the rear panel of the back rest cushion cover in position of use by fastening flexible attaching elements carried thereby to the said rear wall of the seat cushion supporting frame at the bottom thereof, replacing the said severed portion of the said seat cushion with its aforesaid cover thereon upon its supporting frame, securing the bottom edge portion of the rear panel of the seat cushion cover to the said rear wall of the cushion-supporting frame in downwardly extending relationship and over the said bottom edge portion of the front panel of the back rest cushion cover previously secured thereto, and then attaching said other portions of the seat cushion cover to the said seat cushion supporting frame.

2. In a seat cushion cover and back rest cushion cover assembly adapted for use upon an automotive vehicle seat structure of the so-called bucket or like type in which the back rest portion thereof is provided with an undercut concave portion at the lower region of the rear wall thereof, a back rest cushion cover including a front panel, a rear panel, and side panels all integrally secured to each other, said front panel including a bottom edge portion adapted to be secured to the rear wall of the supporting frame for the seat cushion at the front of said wall, a seat cushion cover including a rear section having a lower edge adapted to extend downwardly and be secured to the said rear wall of said cushion-supporting frame over the said bottom edge portion of the said front panel of the said back rest cushion cover in superimposed relation thereto, and the said back rest cushion cover including a sleeve extending upwardly along the juncture between the side and rear panels and across the latter panel at a region elevated from the lower edge thereof and adapted to skirt said concave portion on three sides thereof, an attaching element disposed in the sleeve and having projecting ends adapted to be secured to the said rear wall of the cushion-supporting frame so as to secure the rear panel of the said back rest cushion cover in position of use, the side panels of the back rest cushion cover including portions extending forwardly beyond the front panel of the back rest cushion cover and adapted to extend parallel to the side walls of the seat cushion cover at the sides thereof in contiguous relationship when in position of use.

3. In a seat cushion cover and back rest cushion cover assembly adapted for use upon an automotive vehicle seat structure of the so-called bucket or like type in which the back rest portion thereof is provided with an undercut concave portion at the lower region of the rear wall thereof, a back rest cushion cover including a front panel, a rear panel, and side panels all integrally secured to each other, said front panel including a bottom edge portion adapted to be secured to the rear wall of the supporting frame for the seat cushion at the front of said wall, a seat cushion cover including a rear section having a lower edge adapted to extend downwardly and be secured to the said rear wall of said cushion-supporting frame over the said bottom edge portion of the said front panel of the said back rest cushion cover in superimposed relation thereto, and the said back rest cushion cover including a sleeve extending upwardly along the juncture between the side and rear panels and across the latter panel at a region elevated from the lower edge thereof and adapted to skirt said concave portion on three sides thereof, and an attaching element disposed in the sleeve and having projecting ends adapted to be secured to the said rear wall of the cushion-supporting frame so as to secure the rear panel of the said back rest cushion cover in position of use.

4. The method of installing a seat cover of the type which includes a top panel, front panel, rear panel and side panels all integrally secured to each other, and a back rest cushion cover of the type which includes side panels, a front panel and a rear panel all integrally secured to each other, upon the seat cushion and back rest cushion of a automotive vehicle seat of the so-called bucket or like type which method comprises cutting the seat cushion loose from its supporting frame by cutting horizontally through the body of the said seat cushion along a line located slightly above the upper surface of the said seat cushion supporting frame and then removing the thus severed portion of the said seat cushion from its supporting frame while leaving the remaining portion attached thereto, slipping the back rest cushion cover onto the back rest cushion and securing the bottom edge portion of the front panel of the back rest cushion cover to the rear wall of the seat cushion supporting frame in downwardly extending relationship, securing the rear panel of the back rest cushion in position of use by fastening flexible attaching elements carried thereby to said rear wall of the seat cushion supporting frame at the bottom thereof, replacing the said severed portion of the said seat cushion with its aforesaid cover thereon upon its supporting frame, securing the bottom edge portion of the rear panel of the seat cushion cover to the said rear wall of the cushion-supporting frame in downwardly extending relationship, and over the said bottom edge portion of the front panel of the back rest cushion cover previously secured thereto, and then attaching the lower edge portions of the front and side panels of the seat cushion cover to the said seat cushion supporting frame.

5. A seat cushion cover and back rest cushion cover assembly adapted for use upon an automotive vehicle seat structure of the so-called bucket type and in which the back rest portion of the seat structure is provided with an undercut concave portion in the lower portion of the rear wall thereof, comprising a back rest cushion cover including a front panel, a rear panel, and side panels all integrally secured to each other, said front panel including a bottom edge portion adapted to be secured to the rear wall of the supporting frame for the seat cushion at the front of said wall, the said seat cushion cover including a rear section, front section, top section and side sections, said rear section having a lower edge portion adapted to extend downwardly and to be secured to the said rear wall of the said cushion-supporting frame over the said bottom edge portion of the said front panel of the said back rest cushion cover in superimposed relation thereto, and the said back rest cushion cover including a sleeve extending upwardly along the juncture between the side and rear panels and across the latter panel at a point elevated from the lower edge thereof and adapted to skirt said concave portion on three sides thereof, an attaching element disposed in said sleeve and having projecting ends adapted to be secured to the said rear wall of the cushion supporting frame so as to secure the rear panel of the said back rest cushion cover in position of use, the side panels of the back rest cushion cover including portions extending forwardly beyond the front panel of the back rest cushion cover and adapted to extend parallel to the side walls of the seat cushion cover at the sides thereof in contiguous relationship thereto when in position of use.

THOMAS JAMES McCORMICK.